(12) United States Patent
Gebhart et al.

(10) Patent No.: US 9,997,829 B2
(45) Date of Patent: Jun. 12, 2018

(54) MODULATION CONTROL THROUGH ADAPTIVE PHASE ADJUSTMENT

(71) Applicant: NXP B.V.

(72) Inventors: Michael Gebhart, Linz (AT); Fred George Nunziata, Graz (AT); Hubert Watzinger, Gratwein-Strassengel (AT)

(73) Assignee: NXP B.V., Eindhoven (NL)

( * ) Notice: Subject to any disclaimer, the term of this patent is extended or adjusted under 35 U.S.C. 154(b) by 48 days.

(21) Appl. No.: 15/227,614

(22) Filed: Aug. 3, 2016

(65) Prior Publication Data
US 2018/0040953 A1    Feb. 8, 2018

(51) Int. Cl.
*H01Q 3/30*    (2006.01)
*H01Q 1/22*    (2006.01)

(52) U.S. Cl.
CPC ............. *H01Q 3/30* (2013.01); *H01Q 1/2291* (2013.01)

(58) Field of Classification Search
CPC ................................ H01Q 3/30; H01Q 1/2291
See application file for complete search history.

(56) References Cited

U.S. PATENT DOCUMENTS

| 9,094,113 B2* | 7/2015 | Yang ...................... H04B 15/00 |
| 9,331,748 B2* | 5/2016 | Bernard ............. G06K 19/0723 |
| 2009/0201066 A1* | 8/2009 | Do ............................ G06F 1/08 327/299 |
| 2014/0273828 A1 | 9/2014 | Yang et al. |

FOREIGN PATENT DOCUMENTS

| EP | 2 988 427 A1 | 2/2016 |
| WO | 2016/105714 A1 | 6/2016 |

OTHER PUBLICATIONS

Gebhart, M. et al. "Active load modulation for contactless near-field communication", IEEE Intl. Conf. on RFID-Technologies and Applications, pp. 228-233 (Nov. 2012).
Stark, M. et al. "How to guarantee Phase-Synchronicity in Active Load Modulation for NFC and Proximity", IEEE 4th Intl. Workshop on Near Field Communication, pp. 1-6 (Jan. 2013).

* cited by examiner

*Primary Examiner* — Tuan H Nguyen
(74) *Attorney, Agent, or Firm* — Rajeev Madnawat

(57) ABSTRACT

A Near Field Communication (NFC) enabled device is disclosed. The NFC device includes an antenna. The NFC device also includes an impedance matching network, a carrier frequency generator to generate a carrier wave, a receiver for receiving a magnetic induction wave, a transmitter, a driver circuit configured to alter an impedance of an antenna network associated with the antenna between a first impedance and a second impedance and a control unit. The control unit is configured to derive a first phase difference between the received magnetic induction wave and an internal clock at the first impedance and a second phase difference between the received magnetic induction wave and the internal clock at the second impedance. The control unit is further configured to change a phase of the carrier wave based on a difference between the first phase difference and a second phase difference.

13 Claims, 3 Drawing Sheets

MODULATION CONTROL THROUGH ADAPTIVE PHASE ADJUSTMENT

BACKGROUND

The use of Near Field Communication (NFC) is becoming common place in applications such as contactless payment systems, security access systems, etc. A typical NFC based system consists of a NFC reader (e.g., Point of Sale terminal) and a NFC device, typically a NFC enabled card or a mobile phone.

In order to perform a transaction using a NFC enabled device and a NFC reader, the NFC enabled device is brought near the NFC reader. The communication between the NFC enabled device and the NFC reader may fail if the NFC reader fails to properly demodulate the signal from the NFC enabled device. Such failures may occur if the NFC enabled device is not properly aligned with the NFC reader or if the NFC enabled device is not within a certain distance range from the NFC reader. Other types of readers such as FeliCa readers and EVMCo reader may exhibit similar deficiencies.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a Near Field Communication (NFC) enabled device is disclosed. The NFC device includes an antenna. The NFC device also includes an impedance matching network, a carrier frequency generator to generate a carrier wave, a receiver for receiving a magnetic induction wave, a transmitter, a driver circuit configured to alter an impedance of an antenna network associated with the antenna between a first impedance and a second impedance and a control unit. The control unit is configured to derive a first phase difference between the received magnetic induction wave and an internal clock at the first impedance and a second phase difference between the received magnetic induction wave and the internal clock at the second impedance. The control unit is further configured to change a phase of the carrier wave based on a difference between the first phase difference and a second phase difference.

In another embodiments, a method of correcting a phase of a carrier wave in a NFC enabled device. The method includes changing an impedance of an antenna network associated with an antenna of the NFC enabled device to a first selected impedance, determining a first phase difference between a received magnetic induction wave and an internal clock at the first impedance, changing the impedance of the antenna network associated with the antenna of the NFC enabled device to a second selected impedance, determining a second phase difference between the received magnetic induction wave and the internal clock at the second impedance and changing a phase of a carrier wave generated using the internal clock, based on a difference between the first phase difference and a second phase difference.

In yet another embodiment, a computer readable media including programming instructions which when executed by a processor perform an operation of adjusting a phase of a carrier wave in a NFC enabled device. The operation includes changing an impedance of an antenna network associated with an antenna of the NFC enabled device to a first selected impedance, determining a first phase difference between a received magnetic induction wave and an internal clock at the first impedance, changing the impedance of the antenna network associated with the antenna of the NFC enabled device to a second selected impedance, determining a second phase difference between the received magnetic induction wave and the internal clock at the second impedance and changing a phase of a carrier wave generated using the internal clock, based on a difference between the first phase difference and a second phase difference.

In some embodiments, the control unit is further configured to multiple the difference between the first phase difference and a second phase difference by a preselected factor. In some other embodiments, the control unit is further configured to change the phase of the carrier wave based on a preselected offset in addition to the difference between the first phase difference and a second phase difference. The NFC enabled device may further include a lookup table to derive a value of a phase change based on the difference between the first phase difference and a second phase difference. In another embodiment, the control unit is further configured to derive a value of a phase change based on the difference between the first phase difference and a second phase difference using a preset formula that represents a graph between a phase adjustment value and the difference between the first phase difference and a second phase difference.

In some embodiments, the control unit is configured to calculate the difference between the first phase difference and a second phase difference immediately prior to transmitting each frame through load modulation. The control unit is configured to change the phase of the carrier wave based on the difference between the first phase difference and a second phase difference immediately prior to transmitting each frame through load modulation.

It should be noted that even though the embodiments are described herein using NFC devices, the embodiments may also be applicable to other types of contactless communication devices such as FeliCa Readers, proximity readers, Vicinity readers and other similar devices that communicate through inductive coupling. Further, the term "wave" used herein mean magnetic inductance wave and not electromagnetic waves that are commonly used in long distance communications.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DETAILED DESCRIPTION

Representative devices and methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other embodiments are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
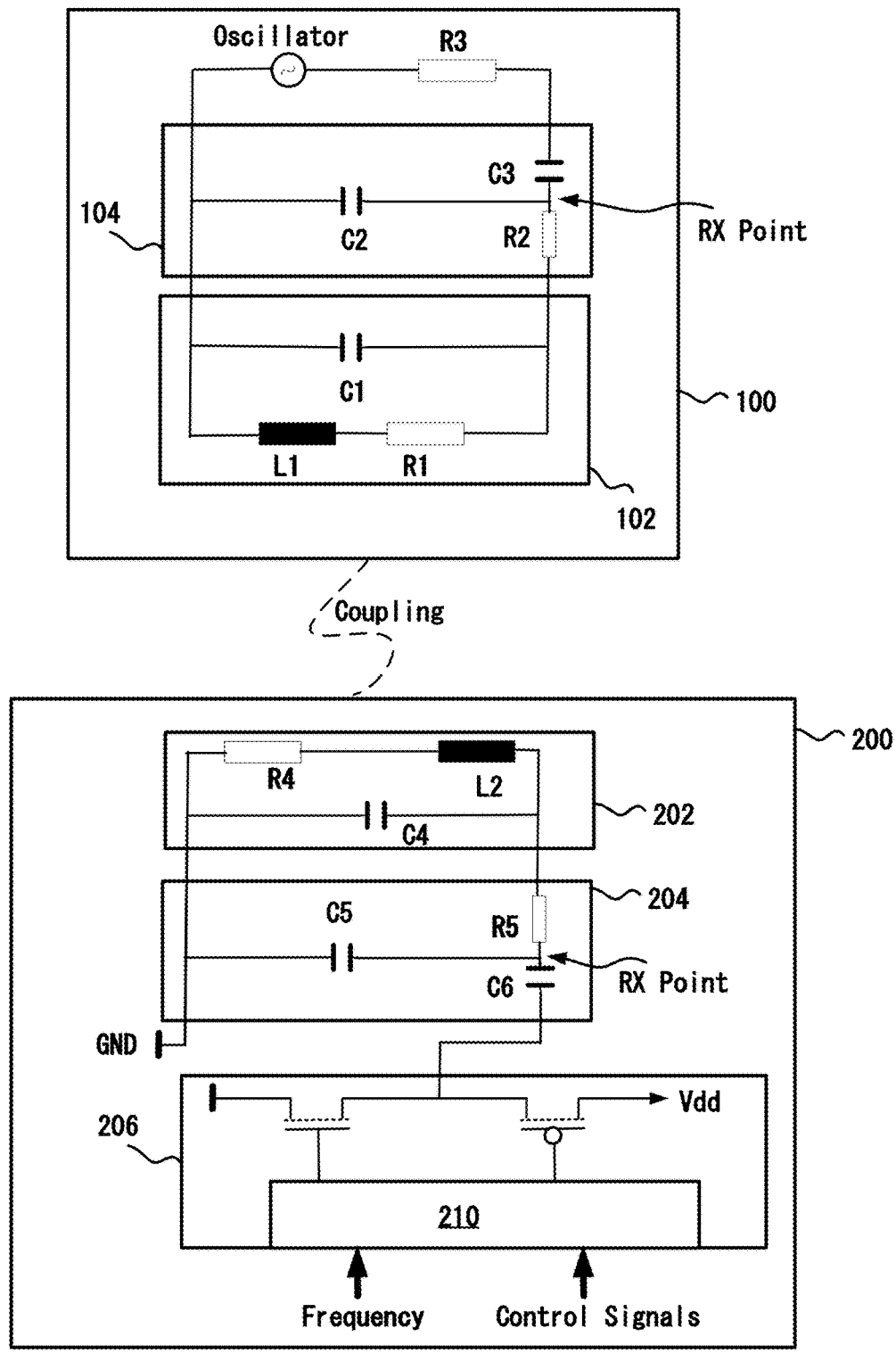
FIG. 1 depicts a system including a schematic of a Near Field Communication (NFC) enabled device and a NFC reader in accordance of one or more embodiments.

FIG. 1 illustrates schematics of a NFC reader 100 and a NFC enabled device 200 (e.g., a mobile phone or a card). Note that in order not to obfuscate the present disclosure, many parts of both the NFC reader 100 and the NFC enabled device 200 are not being shown. For example, the NFC reader 100 may include a control unit (not shown) for processing commands and data and may also be connected to a network through a network interface (not shown). Further, even the parts that are shown, are shown in a simplistic way for the ease of understanding of the present disclosure.

In a typical NFC enabled transaction processing system, the NFC reader 100 continuously transmits a 13.56 MHz signal. Note that even though NFC and the standard NFC frequency of 13.56 MHz is being used for description, a person skilled in the art would appreciate that at least some embodiments described herein would be applicable to systems that includes contactless short distance communication between two devices that may not be NFC enabled.

Figure 2:
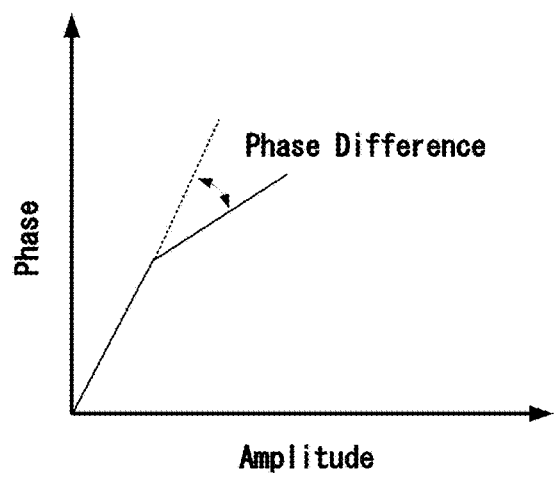
FIG. 2 illustrates phase difference in the signal from the NFC reader and the NFC enabled device due to coupling effect in accordance with one or more embodiments of the present disclosure.
Figure 3:
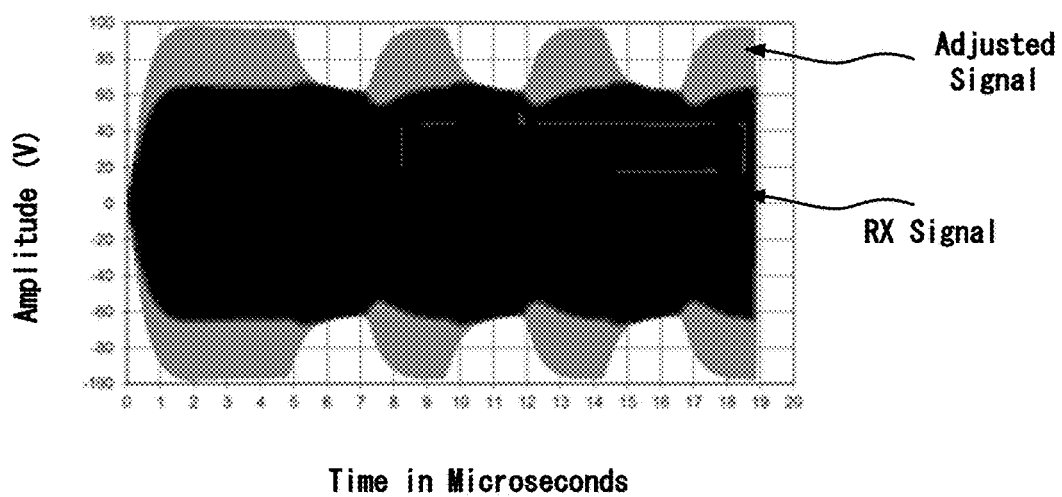
FIG. 3 illustrates signal received at the NFC reader with and without phase adjustments in accordance with one of more embodiments of the present disclosure.

Before describing FIG. 1 further, moving to FIG. 2 and FIG. 3 for a moment. When the NFC enabled device 200 is brought near the NFC reader 100 to perform a transaction, inductance of the antennas of one or both devices may change according to the position and distance between the NFC enabled device 200 and the NFC reader 100. Due to the changed inductance, the antenna impedance may also change. This change in the impedance may cause a phase shift in the transmitted signals. FIG. 2 illustrates, in a very simplistic manner, such phase difference between the carrier signal generated by the NFC reader 100 and the signal received from the NFC enabled device 200. FIG. 3 illustrates a graph showing the RX Signal (the signal received at the NFC reader 100 from the NFC enabled device 200). FIG. 3 also illustrates a graph showing the Adjusted Signal, the signal that should have been received should there be no phase difference (or a phase difference within a preset range). As apparent from the RX signal waveform in FIG. 3, the NFC reader 100 may not correctly decode the amplitude modulated signal from the RX Signal as there is not enough amplitude difference between the lows and highs.

The amplitude modulation is the simplest modulation technique among the wide verity of modulation techniques in use. In this technique the amplitude of a high frequency signal is varied corresponding to the variation in the amplitude of the low frequency modulating signal. The amplitude modulation of a high frequency signal is easy to achieve and the demodulation is also less complex compared to other techniques. The demodulation of an amplitude modulated wave can be done with only few components and unlike most of the demodulation technique. The message signal appears as an envelope over the amplitude of the carrier wave and an envelope detector makes use of this envelope to extract the modulating signal from the carrier. Without proper envelop, the envelope detector in the NFC reader 100 may fail to properly decode the data, or the decoding may be erroneous. Other types of readers such as FeliCa readers and EMVCo readers may also include envelope detectors. However, an envelope detector may not be required in some other types of contactless readers.

Moving back to FIG. 1. The NFC reader 100 includes an oscillator for generating a 13.56 MHz signal and a resistor R3. The oscillator is coupled to an impedance matching network 104 and an antenna 102. The impedance matching network 104 includes a resistor R2, and capacitors C2 and C3. Values of these components are set to derive a desired impedance based on the impedance of the antenna 102. The antenna 102 may be a loop antenna. However, FIG. 1 depicts an electrical equivalent of an antenna. The antenna 102 includes an inductor L1, a resistor R1 and a capacitor C1. In other words, the antenna 102 includes an RLC circuit. In some embodiments, the impedance matching network 104 may also include a RLC circuit instead of a RC circuit. Similarly, on the NFC enabled device 200 side, there is an antenna 202 including a RLC circuit and an impedance matching network 204 including either RC or RLC circuit based on the impedance matching requirements for the antenna 202. The antenna 202 may be a loop antenna. However, FIG. 1 depicts an electrical equivalent of an antenna. Hence, R, L, C components shows in antenna blocks 102, 202 may not be discrete components but represents electrical characteristics of an antenna.

A transmitter (Tx) driver 206 is included in the NFC enabled device 200 coupled to a control unit 210. The control unit 210 may be implemented in hardware or software. In some embodiments, the control unit 210 may receive control signals from an application incorporated in the NFC enabled device 200. The control unit 210, in one embodiment, may include a circuit to derive the Tx driver 206 and to adjust phase difference as described later in this document. In other embodiments, the control unit 210 may include a processor to generate control instructions to change the phase of a carrier wave as described herein and to derive the Tx driver 206. The Tx driver 206 is coupled to other sub-systems (not shown) that provides control signals and data to be transmitted an well as an oscillator for generating a carrier frequency (13.56 MHz for example). Typically, the NFC enabled device 200 is a mobile phone that includes secure storage and central processing unit (CPU). The secure storage includes user's data such as a credit card number or a payment token. In a typical application, such as when a user of the NFC enabled device 200 likes to buy a ticket or a good, the user may instruct the NFC enabled device 200 to be ready for performing a transaction and will bring the NFC enabled device 200 near the NFC reader 100 (which may be installed at a vendor's premises). The secure data is then sent, typically in one or more data frames, depending upon the volume of data to the NFC reader 100. Typically, these types of systems do not involve transfer of a large amount of data. Typically, one or two frames may be sufficient to transfer data such as a payment token. The NFC reader 100 demodulated the received carrier signal to extract the data and verifies the received data typically with the help of a backend system to which the NFC reader 100 may be communicatively connected. Typically, the transaction is complete upon successful verification of the received data and a successful performance of a transaction in the backend system. The process takes very short time, typically in milliseconds. Any hand movement to move the NFC enabled device 200 would typically take more time than the time needed for sending the data to the NFC reader 100. Hence, a physical movement of the NFC enabled device 200 during the transaction become irrelevant in terms of impedance tuning, as described later in this document.

The Tx driver 206 modulates the carrier signal according to the data to be sent to the NFC reader 100 and the modulated signal is transmitted through the antenna 202. Prior to modulating and transmitting the data, the NFC enabled device 200 receives the carrier signal that is being continuously transmitted by the NFC reader 100 and synchronizes its internal clock using, for example, a Phase Locked Loop (PLL). The NFC reader 100 defines the time reference for the communication using its own internal clock, from which the transmitted signal is desired. Note that, the NFC reader 100 may be modulating the continuously transmitted signal to send commands.

After the signal is generated in the NFC reader 100, the signal goes through the impedance matching network 104, the antenna 102, air interference (marked as "coupling" in FIG. 1), the antenna 202 and the impedance matching network 204 before the signal is received at the RX point of the NFC enabled device 200. The signal when received at RX point of the NFC enabled device 200 is phase shifted versus the phase of the signal generated by the oscillator of the NFC reader 100. In some cases, the external housing of the NFC enabled device 200 also plays a role in antenna impedance and this factor is generally not known during the design of the internal impedance matching circuitry. The NFC enabled device 200 locks to the phase of the signal received at the RX point of the NFC enabled device 200. Hence, a phase correction is needed to bring a difference between the phase of the received signal at the RX point of the NFC enabled device 200 and the signal the NFC enabled device 200 will transmit back using the load modulation technique. The load modulation technique used in the embodiments herein is "active load modulation." That means, the NFC enabled device 200 transmits its own modulated high frequency carrier signal via magnetic field emission or H-field.

To derive a phase adjustment factor, the NFC enabled device 200 switches between two known impedance states (e.g., 1 Ohm and 10 Ohms). The Tx driver 206 is configured to alter a Tx driver impedance through a control signal during the process of deriving the phase adjustment factor. A change in the Tx driver impedance also changes the overall impedance of an antenna network associated with the antenna 202. This change in the antenna network impedance also changes the phase of the received magnetic inductance wave. In other words, for deriving a phase adjustment factor, the Tx driver 206, or at least a part thereof, act like a variable resistance in the antenna network associated with the antenna 202. In some embodiments, the variable resistor may be implemented using one or more MOS transistors that are controllable via a control signal applied to a gate of the MOS transistor. The number of such transistors may depend on a desired maximum variation in the impedance. The NFC enabled device 200 measures the phase (relative to the clock of the NFC enabled device 200) of the signal received at the RX point of the NFC enabled device 200 in both impedance states. Based on the two measurements, the NFC enabled device 200 calculates a difference (Delta Phi) of these two measured phases. In some embodiments, these measurements and calculations are done immediately prior to sending every frame. A quadrature signal (IQ) demodulator that uses a CORDIC (which stands for: Coordinate Rotation Digital Computer) may be used associated with a supporting circuitry to measure phase differences described above. The supporting circuitry may include high frequency (HF) attenuator, mixer, bandpass filter, and analog to digital converter (ADC). The reference signal is called "I" and a 90° phase shifted signal is called "Q". $RX_{Amp}$ and $RX_{Phi}$ may be calculated using the following formulas:

$$RXAmp = \sqrt{I^2 + Q^2}$$

$$RXPhi = \arctan\left(\frac{Q}{I}\right)$$

Delta Phi (e.g., $RX_{Phi}$) is used to adjust the phase of the transmitted signal from the NFC enabled device such that when the signal is received at the RX point of the NFC reader 100, the received signal is substantially in phase with the signal that was transmitted from the NFC reader 100. A correlation graph is prepared to correlate different values of Delta Phi to require phase adjustment. This graph, in terms of a mathematical formula or look up table, may be stored in the NFC enabled device 200. In some embodiments, the Delta Phi calculations may be performed through programming instructions stored in a computer readable media embodied in the NFC enabled device 200. In other embodiments, Delta Phi may be derived using a logic circuit. In yet another embodiment, both hardware and software systems may be used in combination to derive Delta Phi. Prior to sending a frame to the NFC reader 100, after Delta Phi is calculated, a phase adjustment value may be derived using the lookup table or the formula.

In some embodiments, a sample of a same type of NFC enabled devices is taken and a multiplication factor to Delta Phi is determined through trials. This factor, when multiplied with the automatically calculated Delta Phi, causes the signal received at the RX point of the NFC reader 100, to be in a closer phase alignment. Such factor is then programmed in all NFC enabled devices of that type and used as a multiplication factor to Delta Phi during frame transmissions. Similarly, a phase alignment offset may also be derived for particular types of NFC enabled devices and programmed into that type of devices. This phase offset is used for altering the automatically calculated phase adjustment through addition or subtraction of the phase offset to/from the calculated phase adjustment.

Figure 4:
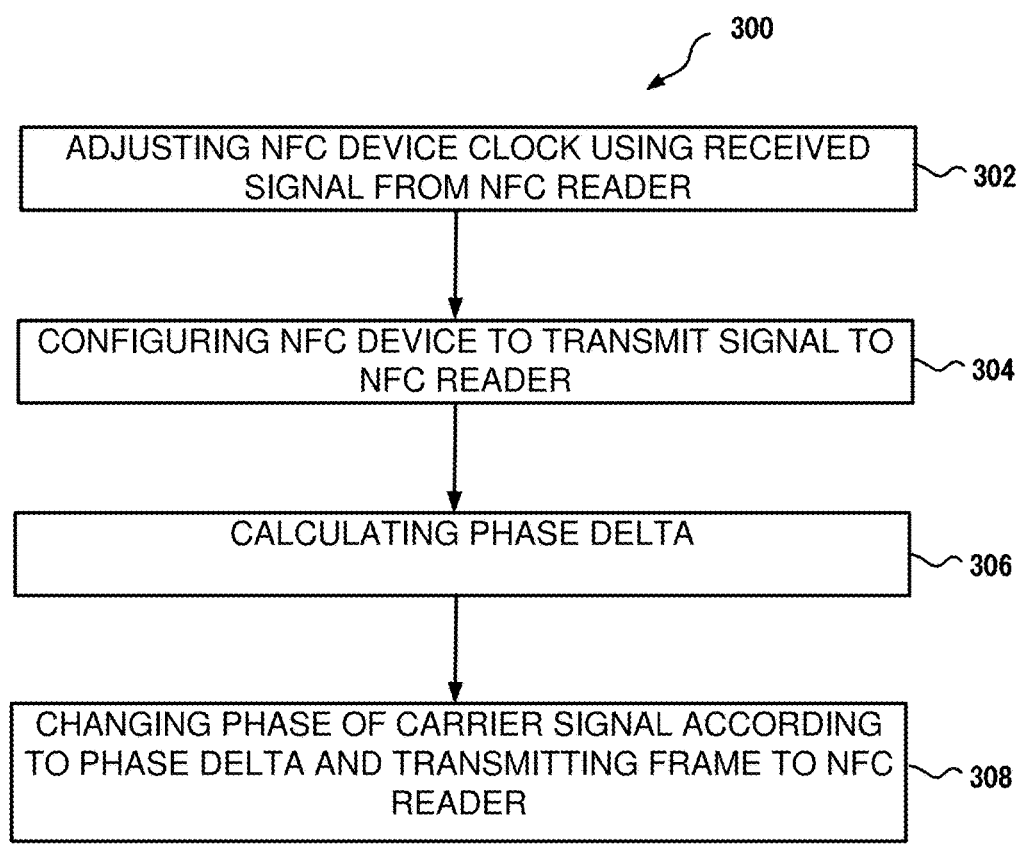
FIG. 4 shows method steps for adjusting phase of a signal in accordance with one of more embodiments of the present disclosure.

FIG. 4 illustrates a method 300 for transmitting a phase corrected load modulation signal to the NFC reader 100 from the NFC enabled device 200. Accordingly, at step 302, the internal clock of the NFC enabled device is synchronized using the signal received from the NFC reader 100. At steps 304 and 306, the NFC enabled device 200 is configured to measure a phase difference between the phase of the received signal from the NFC reader 100 with reference to the internal clock of the NFC enabled device 200 at a preselected first antenna impedance and at a preselected second antenna impedance of the NFC enabled device 200. At least the steps 304 and 306 are performed each time a frame is transmitted from the NFC enabled device 200 to the NFC reader 100, immediately prior to the transmission of the frame. The phase of the transmitted signal that is load modulated to include the frame to be transmitted, is adjusted according the calculated phase difference. In some embodiment, a preselected offset is applied to the phase adjustment. In some embodiment, a NFC enabled device specific, preselected factor may also be used to multiply the calculated phase adjustment.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A Near Field Communication (NFC) enabled device, comprising:
an antenna;
an impedance matching network;
a carrier frequency generator to generate a carrier wave;
a receiver for receiving a magnetic induction wave;
a driver circuit configured to alter an impedance of an antenna network associated with the antenna between a first impedance and a second impedance;
a transmitter; and
a control unit configured to derive a first phase difference between the received magnetic induction wave and an internal clock at the first impedance and a second phase difference between the received magnetic induction wave and the internal clock at the second impedance, wherein the control unit is further configured to change a phase of the carrier wave based on a difference between the first phase difference and a second phase difference.

2. The NFC enabled device of claim 1, wherein the control unit is further configured to multiple the difference between the first phase difference and a second phase difference by a preselected factor.

3. The NFC enabled device of claim 1, wherein the control unit is further configured to change the phase of the carrier wave based on a preselected offset in addition to the difference between the first phase difference and a second phase difference.

4. The NFC enabled device of claim 1, further including a lookup table to derive a value of a phase change based on the difference between the first phase difference and a second phase difference.

5. The NFC enabled device of claim 1, the control unit is further configured to derive a value of a phase change based on the difference between the first phase difference and a second phase difference using a preset formula that represents a graph between a phase adjustment value and the difference between the first phase difference and a second phase difference.

6. The NFC enabled device of claim 1, wherein the control unit is configured to calculate the difference between the first phase difference and a second phase difference immediately prior to transmitting each frame through active load modulation.

7. The NFC enabled device of claim 6, wherein the control unit is configured to change the phase of the carrier wave based on the difference between the first phase difference and a second phase difference immediately prior to transmitting each frame through active load modulation.

8. A method of correcting a phase of a carrier wave in a NFC enabled device by a transmitter driver, the method comprising: changing an impedance of an antenna network associated with an antenna of the NFC enabled device to a first selected impedance; determining a first phase difference between a magnetic induction wave and an internal clock at the first impedance; changing the impedance of the antenna network associated with the antenna of the NFC enabled device to a second selected impedance; determining a second phase difference between the received magnetic induction wave and the internal clock at the second impedance; and changing a phase of a carrier wave generated using the internal clock, based on a difference between the first phase difference and a second phase difference.

9. The method of claim 8, wherein the changing the phase includes multiplying the difference between the first phase difference and a second phase difference by a preselected factor associated with the NFC enabled device.

10. The method of claim 8, wherein the changing the phase further include altering the phase of the carrier wave based on a preselected offset in addition to the difference between the first phase difference and a second phase difference.

11. The method of claim 8, further including searching a data table to derive a value of a phase change based on the difference between the first phase difference and a second phase difference.

12. The method of claim 8, further includes deriving a value of a phase change based on the difference between the first phase difference and a second phase difference using a preset formula that represents a graph between a phase adjustment value and the difference between the first phase difference and a second phase difference.

13. The method of claim 8, wherein the changing the phase is performed immediately prior to transmitting each frame through active load modulation.

* * * * *